United States Patent [19]  
De Bruyne et al.

[11] Patent Number: 4,983,467  
[45] Date of Patent: Jan. 8, 1991

[54] COMPACTING OF A METAL WEB PRODUCT MADE

[75] Inventors: Roger De Bruyne, Zulte; Hervé Schepens, Zwevegem-Otegem; Ignace Lefever, Deerlijk; Ronny Losfeld, Waregem, all of Belgium

[73] Assignee: N. V. Bekaert S.A., Zwevegem, Belgium

[21] Appl. No.: 288,154

[22] Filed: Dec. 22, 1988

[30] Foreign Application Priority Data

Dec. 29, 1987 [EP] European Pat. Off. ........ 87202635.6

[51] Int. Cl.⁵ .............................................. B23P 17/06
[52] U.S. Cl. ................................................... 428/605
[58] Field of Search .......................................... 428/605

[56] References Cited

U.S. PATENT DOCUMENTS 1,018,618 2/1912 Huntoon .
1,863,854 6/1932 Jeffery .
1,864,365 6/1932 Montgomery .

FOREIGN PATENT DOCUMENTS 0157432 10/1985 European Pat. Off. .
0227131 7/1987 European Pat. Off. .
1190844 5/1970 United Kingdom .

OTHER PUBLICATIONS

P. Ducheyne et al. "Isostatically Compacted Metal Fiber Porous Coatings for Bone Ingrowth", Power Metallurgy International, vol. 11, No. 3, 1979, 115–119.
W. J. Huppmann et al. "Cold Isostatic Pressing of Stainless Steel Filter Cartridges", Progress in Power Metallurgy, vol. 41, 1986, 579–588.

Primary Examiner—Peter D. Rosenberg
Attorney, Agent, or Firm—Foley & Lardner, Schwartz, Jeffery Schwaab, Mack, Blumenthal & Evans

[57] ABSTRACT

A method of compacting a non-woven sintered metal web (1), characterized in that said non woven metal web (1) as such is isostatically pressed, preferably cold isostatically pressed. The isostatically pressed metal web may be used in filter applications and in radiant surface combustion burners.

9 Claims, 3 Drawing Sheets

COMPACTING OF A METAL WEB PRODUCT MADE

BACKGROUND OF THE INVENTION

The invention relates to a method of compacting a non woven sintered metal web. The invention also relates to a non woven sintered metal web obtained by said method. Such a non woven metal web may be used in filters and in radiant surface combustion burners.

By non woven metal web is meant a web consisting of metal fibers having a diameter of less than 100 micrometer, preferably less than 60 micrometer. e.g. 25 $\mu$m, 15 $\mu$m, 2 $\mu$m or 1.5 $\mu$m. These metal fibres have rough outer surfaces and are randomly distributed in the web and are interlocked in an intermingled relationship substantially solely by means of the rough outer surfaces thereof in a frictional engagement. A non woven metal web may comprise two or more layers wherein each layer comprises metal fibres of about the same diameter and wherein the diameters of the different layers are not necessarily equal to each other. By a non woven metal web is also meant a non woven metal web reinforced by one or more wire meshes. A non woven metal web may be produced by a rando-feeder-webber apparatus which is disclosed in GB 1.190.844.

This non woven metal web may be sintered or not, but relating to this invention the sintered form is to be preferred. By sintering a bond is created at the points of crossing of the different fibers.

It is well known to use non woven metal webs in filters. The pore size is one of the most important characteristics of a filter. It determines the size of the particles which will be kept by the filter. In order to obtain a specified limited pore size the non woven metal web has been compacted by pressing or rolling up to now. However, these conventionally compacted non woven webs have some limitations. The density, i.e. a measure For the compactness (for correct definition, see below), corresponding to a specified pore size is quite high. This causes relatively higher pressure drops over the filter or necessitates the use of larger filter surfaces or the use of ventilators and pumps with more power.

It is also known to use non woven metal webs as panels in radiant surface combustion burners. These burners can have a true radiant surface combustion, i.e. no blue flame patches or no free flame, with a thermal output up to 900 kW m$^{-2}$. However, until now this has only been possible with non woven webs having a limited surface of about 40.000 mm$^2$ or less (and this not on a constant basis), or, if one desires to use surfaces greater than 40.000 mm$^{-2}$, with thermal outputs which are limited to 500 kW m$^{-2}$ or less. This represents a severe restriction for the application of these burners.

SUMMARY OF THE INVENTION

It is an object of the present invention to mitigate the limitations of the prior art. It is an object of the present invention to provide a method of compacting a non woven sintered metal web. It is also an object of the present invention to provide a non woven metal web adapted for the use in filters and compacted according to said method. It is still another object of the present invention to provide a non woven metal web adapted for the use in radiant surface combustion burners and compacted according to said method.

According to one aspect of the present invention there is provided a method of compacting a non woven metal web, preferably a sintered non woven metal web, characterized in that said non woven metal web as such is isostatically pressed, preferably cold isostatically pressed.

By isostatically pressing is meant the fact that the pressure is transmitted by a medium in such a way that the pressure is equal at each point of the surface of the body to be treated, in this case the non woven metal web. The medium may be a gas, a liquid, a felty material, a flexible membrane or a combination of a flexible membrane and a gas or a liquid. An oil medium is suitable for high pressures (above 1000 bar) and for small surfaces (below 250 000 mm$^2$). A combination of oil and rubber and a felty material are more suitable for smaller pressures and for larger surfaces. By cold isostatic pressing is meant that the whole process is done at ambient temperature. By "isostatic pressing the non woven metal web as such" is meant that, except For separators between the web and the pressure medium and possibly a support only the non woven metal web is isostatically pressed.

The immediate result of isostatic pressing is that final conventional compacting by pressplates or rolling is no longer necessary.

In most cases, the result of isostatic pressing may be easily seen on the product: A sintered non woven metal web which is conventionally compacted by rolling or by pressplates has two flat or even outer surfaces. A sintered non woven metal web which is isostatically pressed, on the contrary, does no longer have two completely flat or even surfaces. At least one surface has small thickness variations resulting in a roughened or dull outlook.

According to a second aspect of the invention there is provided a non woven metal web, preferably a sintered non woven metal web, characterized in that said non woven metal web is isostatically pressed as such, preferably cold isostatically pressed as such.

Such a non woven metal web may be a non woven metal web adapted For the use in filters. A non woven metal web adapted for the use in filters comprises e.g. stainless steel fibres having a diameter which is less than 50 micrometer, preferably less than 25 micrometer. e.g. 6.5 $\mu$m or 2.0 $\mu$m.

Such a non woven metal web may also be used in radiant surface combustion burners. A non woven metal web adapted for the use in radiant surface combustion burners comprises metal fibres having a diameter less than 100 micrometer, preferably less than 60 micrometer and containing chromium, aluminium and stabilizing elements such as yttrium, titanium or niobium. Examples of suitable alloys are FeCrAlY, FeCrAlNb. FeNiCrAlY and FeNiCrAlNb.

Such a non woven metal web adapted for the use in radiant surface combustion burners preferably has a permeability variation $$\frac{P_{max.} - P_{min.}}{P_{max.}} \times 100$$

which is less than 10%.

The reason why the permeability variation is used here instead of the more conventionnal statistical quantity o is that Flames in a radiant surface combustion burner appear at the most permeable areas of the non woven metal web. Only one more permeable place is sufficient to cause a blue flame patch. As a consequence the extreme values are appropriate values to determine the behaviour of the radiant surface combustion burner.

The permeability P is expressed in $m^3/h.m^2$. This permeability P may be measured as follows. The non woven metal web is divided into equal squares each having a surface of $2500 mm^2$. In order to determine the permeability of each square, two half cylinders, each having an inner diameter of 35 mm. are placed in line with each other on both sides of the non woven metal web. A pressure drop of 1000 Pa is applied across the non woven metal web and the air flow rate is measured. This flow rate divided by the cross-section surface gives the permeability P.

$P_{max}$ is the maximum permeability for a fluid measured any spot along the surface of the web and $P_{min}$ is the minimum permeability for a fluid measured at any spot along the surface of the web.

The reason why the method according to the invention mitigates the limitations of the prior art can be explained as follows:

A non woven metal web such as produced for example by a rando-feeder-webber apparatus (GB 1.190.844) is not preferably homogeneous if it is to be used in filters or in radiant surface combustion burners. The variance in weight per surface unit may be too great. Sintering and/or compacting by conventional pressing or rolling do not improve its homogeneity, on the contrary.

The inventors have now discovered that isostatic pressing instead of conventional compacting improves the homogeneity of a non woven metal web and that improved homogeneity leads to better characteristics of the non woven metal web when used as a filter (small pore size and small pressure drop) and to better characteristics of the non woven metal web when used in a radiant surface combustion burner (small variance in permeability).

BRIEF DESCRIPTION OF THE DRAWINGS The invention will be best understood from the following description when read in connection to the accompanying drawings, wherein FIGS. 1 and 2 show the principle of isostatic pressing;

DETAILED DESCRIPTION OF THE PREFERRED EMBODIMENTS

Figure 1:
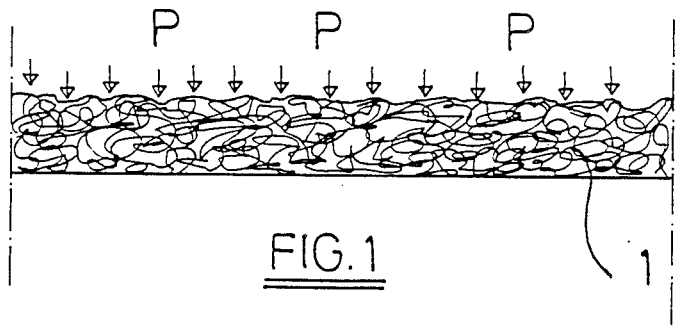
Figure 2:
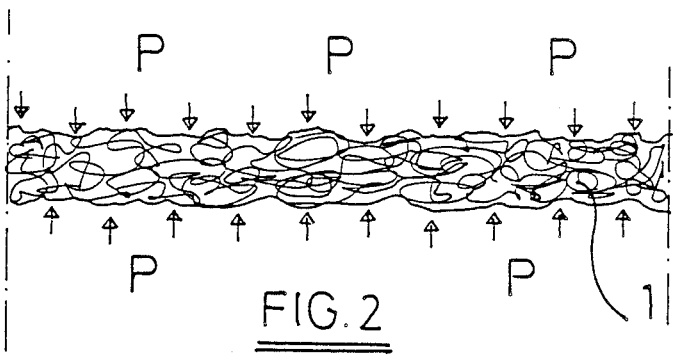

FIGS. 1 and 2 are schematic drawings showing the principle of isostatic pressing a non woven metal web 1. In FIG. 1 the pressure is applied on one side and hence the web 1 has one roughened surface after the treatment. In FIG. 2 the pressure is applied on both sides and the web 1 has two roughened surfaces after the treatment (in both figures the roughness is exaggerated).

Figure 3:
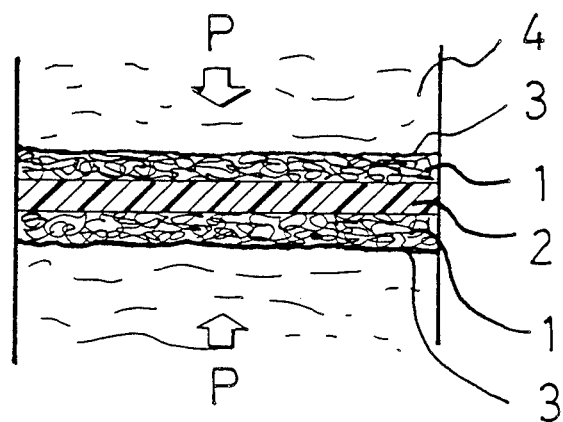
FIG. 3 shows the configuration in an oil medium.

FIG. 3 shows the configuration in an oil medium. Two non woven metal webs 1 are supported by a stainless steel plate 2. Between the two metal webs 1 and the oil medium 4 are two flexible separators 3 which prevent the webs 1 from being contaminated with oil. Suitable flexible separators are plastic or rubber foils.

Figure 4:
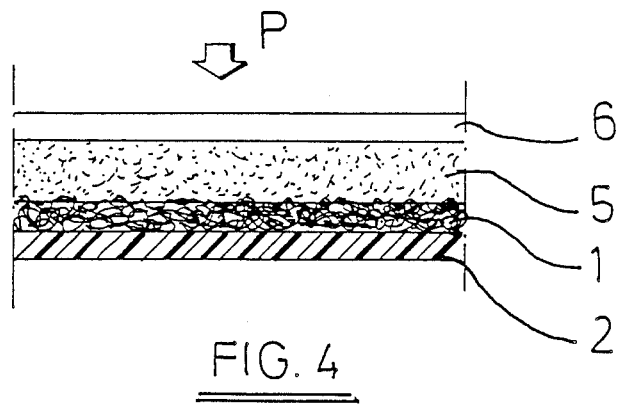
FIG. 4 shows the use of a Felty material as a pressure medium.

In FIG. 4 the pressure medium is a thick felty material 5. The web 1 lies between this felty material 5 and a support 2. The pressure may be exercized by a conventional press-plate 6.

Isostatic pressing as such, and more particularly cold isostatic pressing as such, is widely known in the art. Examples of early patents in this field are U.S. Pat. Nos. 1,018,618, 1,863,854 and 1,864,365.

Figure 5:
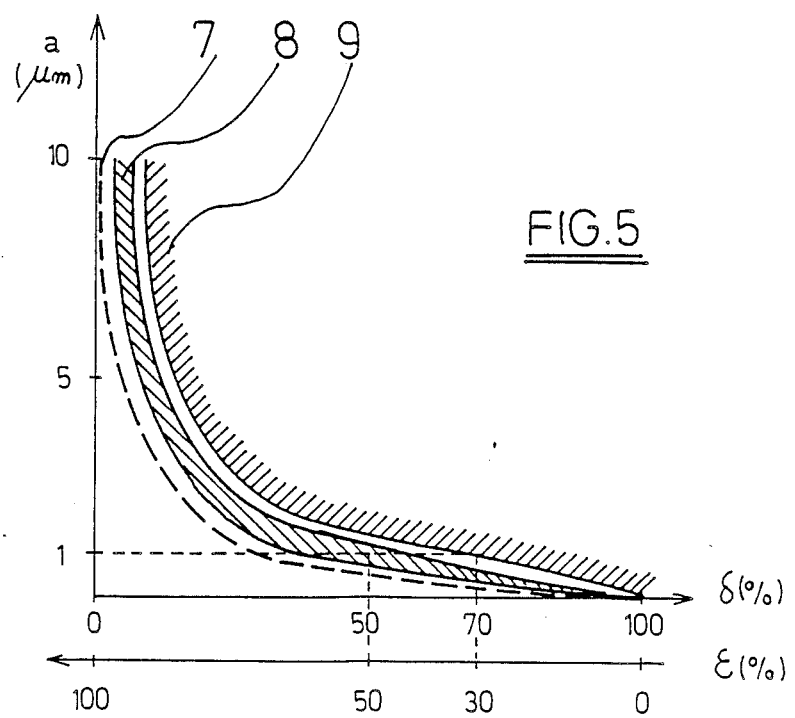
FIG. 5 shows the relationship between the pore size a and the density $\delta$ for a specific fibre diameter.
Figure 6:
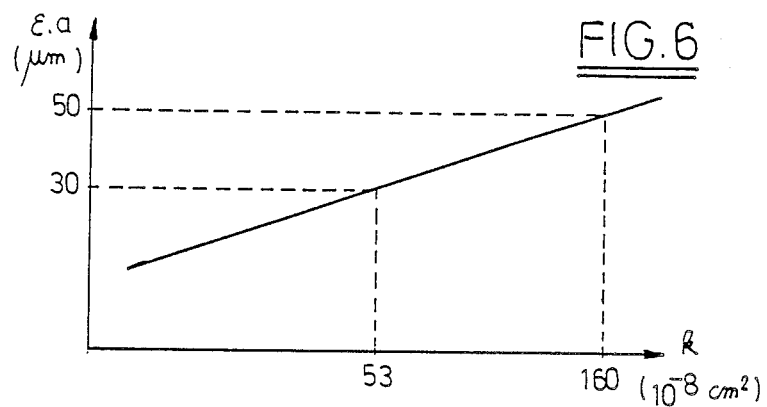
FIG. 6 shows the relationship between the porosity $\epsilon$ multiplied by the pore size a and the permeability coefficient k.
Figure 7:
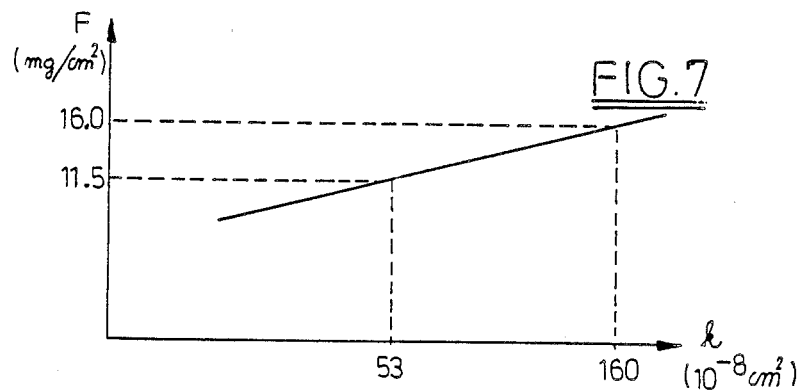
FIG. 7 shows shows the relationship between the dirt holding capacity F and the permeability coefficient k.

The advantageous effects of the application of isostatic pressing to filter applications can be easily understood from FIGS. 5 to 7.

FIG. 5 shows the relationship between the absolute pore size a and the density $\delta$. The absolute size a is equivalent to the mean flow pore size as measured by the extended bubble point pressure test. This test may be carried on by microprocessor controlled Coulter ® porometer. More details about this test can be found in the paper by R. De Bruyne, The application of "nonmedia" standards in the design and testing of filter media. R & D Innovations in Filtration, The twelve beste papers from a 10th anniversary competition organized by the Belgian Filtration Society. p. 75-108.

The density $\delta$ ($0 \leq \delta \leq 1$) is the ratio of the mass of the non woven metal web to the mass of a massive block having the same volume of the non woven metal web and made of the same metal. The value of the porosity $\epsilon$ corresponds to $1 - \delta$. Both density and porosity can be expressed in %.

Curve 7 of FIG. 5 represents the ideal relationship between a and $\delta$, i.e. the relationship where the web is perfectly homogeneous. The shaded area B corresponds to values which are attainable by isostatic pressing, whereas the shaded area 9 corresponds to values which are attainable by conventional compacting according to the state of the art.

Take as an example a Bekipor ® 3A12 web. This is a stainless steel web consisting of 4 layers and having a weight of about 850-950 $g/m^2$.

In order to obtain a mean flow pore size a of 1 $\mu m$ the sintered non woven metal web must be isostatically pressed to a density $\delta$ of about 50%, i.e. a porosity $\delta$ of about 50%.

The same mean flow pore size a of 1 $\mu m$ may be obtained by conventional compacting of the sintered non woven metal web to a density $\delta$ of 70% i.e. a porosity $\epsilon$ of 30%. This means that for the same values of the pore size at the isostatically pressed webs are more porous than the conventionally compacted webs. This also means that for the same value of the porosity $\epsilon$ an isostatically pressed web may have a smaller pore size a than a conventionally compacted web.

This has considerable consequences. FIG. 6 shows the relationship between the porosity multiplied by the pore size $\epsilon.a$ and the permeability coefficient k (not to be confused with the permeability P). This relationship has been experimentally determined to be $$k = 0.033 \times (\epsilon.a)^{2.173}$$

(The scales on FIG. 6 are not linear.) An ($\epsilon.a$)-value of 50 corresponds to a k of $160.10^{-8}$ cm whereas an ($\epsilon.a$)-value of 30 corresponds to a k of $53.10^{-8}$ $cm^2$. Ther permeability coefficient obtained by isostatic pressing is three times the permeability coefficient obtained by conventional compacting. Having regard to the Darcy equation $$\Delta P = \frac{\mu \cdot Q \cdot H}{k \cdot A} + \text{higher order terms}$$

where

ΔP is the pressure drop over the filter,
Q the flow rate,
H the thickness of the filter,
A the surface of the filter,
μ the viscosity coefficient
and k the permeability coefficient, the latter means that a pressure drop over a web according to the invention is about three times lower than a pressure drop over a conventionally compacted web. This lower pressure drop enables the use of smaller surfaces or the use of pumps or ventilators having a smaller power.

Another advantage can be derived from FIG. 7. FIG. 7 represents the dirt holding capacity F in function of the permeability coefficient k. This relationship has been experimentally determined to be $$F = 3.48 k^{0.30}$$

(Both scales on FIG. 7 are non-linear scales). The dirt holding capacity F is the amount of artificial contaminant which can be added to the filter element before the pressure drop at constant flow becomes unacceptably high. In the example the web according to the invention permits an F-value of 16.0 mg/cm² whereas the conventionally compacted web permits an F-value of 11.5 mg/cm². This also mean that the invention reduces the number of standstills and reduces the production loss caused by these standstills.

Test 1

Table 1 summarizes the results of an isostatic pressure test applied on non woven metal webs Bekipor ® 3A12 adapted for the use in filters. The pressure medium is oil. In examples 1 to 4 the webs have been sintered before isostatically compacting the web, in examples 5 and 6, the webs are not sintered. Both pore size a and σ(a) are measured by the extended bubble point test.

TABLE 1

| | Isostatic pressure test in an oil medium | | | | | |
|---|---|---|---|---|---|---|
| sintered (Yes/No) | weight (g/m²) | thickness H (mm) | porosity Σ (%) | isostatic pressure p (bar) | pore size a (μm) | σ (a) (μm) |
| 1 Yes | 923 | 0.563 | 79.2 | 80 | 4.217 | 0.136 |
| 2 Yes | 926 | 0.293 | 60.0 | 2000 | 1.213 | 0.018 |
| 3 Yes | 923 | 0.245 | 52.3 | 3500 | 0.880 | 0.024 |
| 4 Yes | 930 | 0.225 | 47.7 | 4000 | 0.805 | 0.022 |
| 5 No | 849 | 0.75 | 85.7 | 2000 | 1.5 | — |
| 6 No | 897 | 0.268 | 57.6 | 4000 | 0.915 | 0.018 |

In order to obtain a 3A12 web with a pore size a of 1 μm, the isostatic pressure must have a value between 3000 and 3500 bar.

Test 2

In a second test a non compacted sintered 3A12 web is compared to an isostatically compacted sintered 3A12 web. The permeability P is measured for both values in the same way as described above, but a pressure drop of 200 Pa instead of 1000 Pa is applied. The pressure medium is a combination of a rubber membrane and oil. Table 2 sunmmarizes the results.

TABLE 2

| | isostatic pressure test in a rubber + oil medium | | | |
|---|---|---|---|---|
| sintered (Yes/No) | isostatic pressure p (bar) | Mean value of permeability P (l/min. dm²) | σ (P) (l/min. dm²) | $\frac{Pmax - Pmin}{Pmax.} \times 100$ (%) |
| 1 Yes | 1 | 6.275 | 0.637 | 29.6 |
| 2 Yes | 700 | 6.063 | 0.325 | 18.5 |

Table 2 shows that isostatic pressing reduces considerably the variation of the permeability P.

Test 3

Four sintered conventionally compacted FeCrAly-webs are compared to four sintered isostatically compacted FeCrAly-webs. The applied isostatic pressure p was 50 bar. The pressure drop across the web was 1000 Pa. Table 3 summarizes the results.

TABLE 3

| | Comparison prior art - invention in application for radiant surface combustion burners | | | | | | |
|---|---|---|---|---|---|---|---|
| sintered (Yes/No) | isostatically compacted (Yes/No) | weight (g/m²) | thickness H (mm) | Surface A (mm²) | Pmin. (m³/hm²) | Pmax. (m³/hm²) | $\frac{Pmax. - Pmin.}{Pmax.}$ (%) |
| 1 Yes | No | 5300 | 4.0 | 120 000 | 3100 | 4350 | 28.74 |
| 2 Yes | No | 5300 | 4.0 | 120 000 | 3400 | 4100 | 17.07 |
| 3 Yes | Yes | 5350 | 3.95 | 120 000 | 3550 | 3950 | 10.13 |
| 4 Yes | Yes | 5400 | 4.0 | 120 000 | 3600 | 3900 | 7.69 |
| 5 Yes | No | 5300 | 4.0 | 50 000 | 3300 | 3900 | 15.38 |
| 6 Yes | No | 5300 | 4.0 | 50 000 | 3400 | 4000 | 15.00 |
| 7 Yes | Yes | 5400 | 4.0 | 50 000 | 3700 | 3900 | 5.13 |
| 8 Yes | Yes | 5450 | 4.05 | 50 000 | 3550 | 3800 | 6.58 |

In order to appreciate these results, we can apply the following rule of thumb: A permeability variation $$\left( = \frac{Pmax. - Pmin.}{Pmax.} \times 100 \right) \text{of } 5\%$$

corresponds to a thermal output of 900 kW/m², a permeability variation of 10% to a thermal output of 700 kW/m² and a permeability of 20% to a thermal output of 500 kW/m² before the first blue flame patch appears, i.e. before the production of nitrogen oxides exceeds 100 ppm. This means that a web according to the invention allows greater thermal outputs with true radiant surface combustion.

The invention is not limited to one specified filter application. An isostatically compacted web may be used for filtering gas, fuels, polymers and other liquids. The invention is neither limited to a determined pore size a of about 1 μm. The invention may be used to obtain non woven metal webs adapted for the use in filters having a pore size a which is less than 0.5 μm. e.g. 0.4 or 0.3 μm.

The invention is neither limited to the geometrical form of the sintered webs. Isostatic pressing may be applied both to flat sintered non woven webs as to webs having, a cylindrical form.

Isostatic pressing may not only be applied to a non woven metal web, but also to glued glass fiber webs and metal foams.

We claim:

1. A method of treating a non-woven metal web, said method comprising the steps of:
   (i) sintering said web; and
   (ii) subsequently isostatically pressing said web.

2. A method according to claim 1, wherein said step (ii) comprises the step of cold isostatically pressing said web.

3. A method according to any one of claims 1 or 2, wherein said step (ii) comprises the step of applying isostatic pressure to said web via a combination of a flexible membrane and a liquid.

4. A method according to any one of claims 1 or 2, wherein said step (ii) comprises the step of applying isostatic pressure to said web via a combination of a felt-like material and a press plate.

5. A web produced by the method of claim 1.

6. A non-woven sintered metal web comprising a sintered web which has been isostatically pressed.

7. A web according to claim 6, wherein said web is adapted for use in filters.

8. A web according to claim 6, wherein said web is adapted for use in radiant surface combustion burners.

9. A web according to claim 7, wherein the permeability variation of said web, defined as $((P_{max}-P_{min})/P_{max}) \times 100\%$, is smaller than 10%, wherein $P_{max}$ is the maximum permeability measured at any spot along a surface of said web and $P_{min}$ is the minimum permeability measured at any spot along the surface of said web.

* * * * *